United States Patent [19]
Meyer

[11] 3,836,118
[45] Sept. 17, 1974

[54] ADJUSTABLE WORK SUPPORT ASSEMBLY
[75] Inventor: Engelbert A. Meyer, Union Lake, Mich.
[73] Assignee: USM Corporation, Boston, Mass.
[22] Filed: Sept. 20, 1973
[21] Appl. No.: 399,465

[52] U.S. Cl. .................................. 254/104, 269/104
[51] Int. Cl. ........................... B25b 3/00, F16b 2/14
[58] Field of Search ...... 269/104, 234; 254/42, 104; 248/188.2; 29/200 P, 253; 238/281, 282; 33/194

[56] References Cited
UNITED STATES PATENTS

| | | | |
|---|---|---|---|
| 2,004,264 | 6/1935 | Wyrick | 254/104 |
| 2,709,571 | 5/1955 | Mafera | 254/104 |
| 2,819,037 | 1/1958 | Wilkin | 254/104 |
| 3,404,501 | 10/1968 | Von Wedel | 52/122 X |

FOREIGN PATENTS OR APPLICATIONS

| | | | |
|---|---|---|---|
| 1,190,086 | 4/1970 | Great Britain | 254/104 |

Primary Examiner—Roy Lake
Assistant Examiner—Neil Abrams
Attorney, Agent, or Firm—Carl E. Johnson; Vincent A. White; Richard B. Megley

[57] ABSTRACT

A two-piece assembly one part of which is adjustably slidable relative to the other and into load-bearing position to hold a workpiece or structural assembly. The parts, which desirably may be of molded plastic, are formed with cooperative interlocking guide means, and their interfaces preferably include serrations disposed in inclined planes whereby the parts are anchored against slippage from a suitably adjusted work supporting relation. The range of take-up action is dependent on the ramp inclination of the base part upon which a normally shorter complementary part is movable into and automatically locked in work abutting position.

4 Claims, 8 Drawing Figures

PATENTED SEP 17 1974

3,836,118

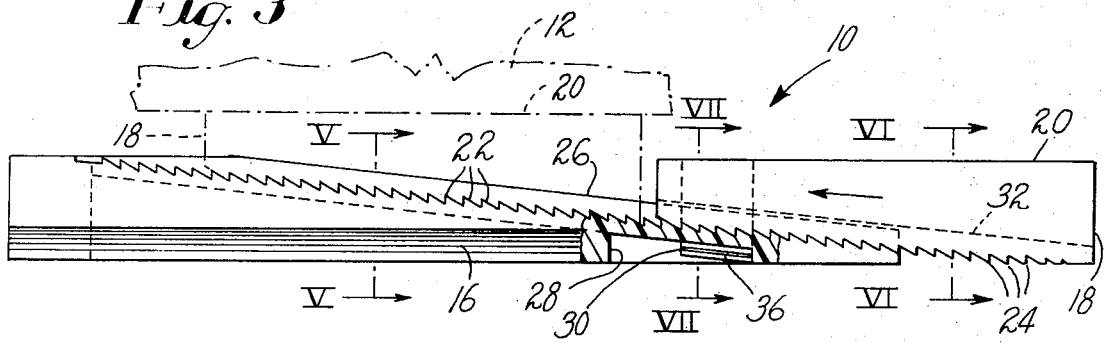
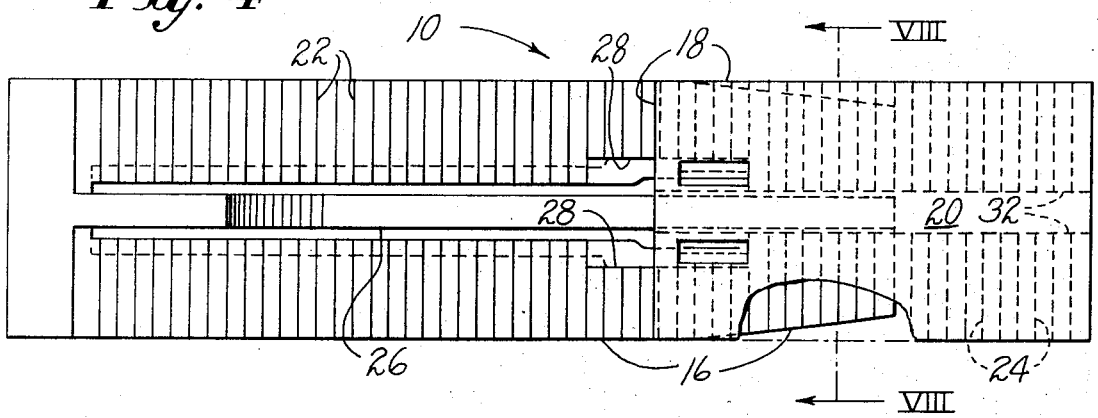
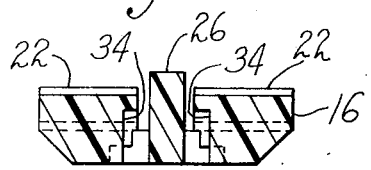
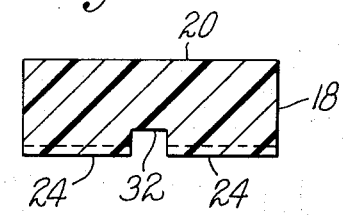
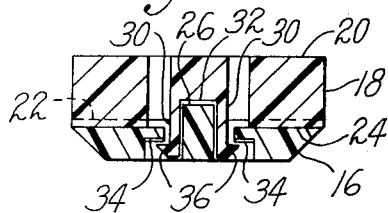
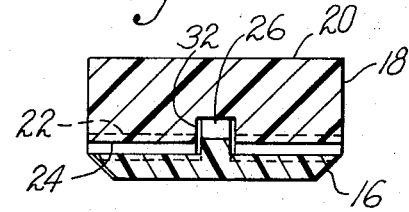

ADJUSTABLE WORK SUPPORT ASSEMBLY

BACKGROUND OF THE INVENTION

This invention relates to devices for adjustably positioning and/or supporting workpieces with respect to work supports. More particularly, the invention pertains to a two-part wedge-type spacer for adjustably supporting a workpiece in spaced or take-up relation on a structure.

It is highly desirably when making many assemblies to be able to arrange workpieces in spaced relation with some precision, or at least to be able to suitably and reliably support one part with respect to another when the gap between them has a variable dimension which must be within predetermined acceptable range. A common field of use for the present invention, for example, is that of mounting glass in a window frame or with respect to other structure. Only by way of particular illustration of this invention glass windshield mounting in vehicles is herein described. It will be recognized that various well known expedients including shims and sliding single wedges have previously been employed as take-up devices, and that their usage has not always conveniently produced uniformly good and permanent results. Application of the invention is by no means limited to glass installations, but it is likely to have advantages in numerous and varying other fields.

SUMMARY OF THE INVENTION

In view of the foregoing, it is an object of this invention to provide an improved, economical, adjustable work supporting device capable of taking up dimensional variations and holding its load supporting position.

More specifically, it is an object of this invention to provide an easily adjustably, wedge-like spacer useful between predetermined minimum and maximum gap-filling positions and effective to permanently support one workpiece of an assembly in selective relation to another.

To these ends the invention contemplates a two-part wedge-type spacing assembly comprising a tapered base portion and a complemental slide portion thereon. The base and slide are formed with interlocking guide means, and the interfaces of the base and slide are formed with cooperative serrations operative when an exposed surface of the slide abuts one workpiece to hold it supported in fixed but suitably spaced relation to another workpiece engaging the bottom of said base. As herein shown, the parts are preferably of molded plastic and initially have a detachable snap-fit relation which is changed to an interlocked connection as the slide is relatively moved longitudinally over the base to operative work supporting position. A further feature resides in the provision of a guiding arrangement comprising a longitudinal tongue and groove formation, resilient upstanding arms at opposite sides of the grooves being spaced to embrace the tongue and having out-turned flanged ends adapted to be slidingly received in ways formed parallel to the tongue.

BRIEF DESCRIPTION OF THE DRAWINGS

The foregoing and other features of the invention will now be more particularly described in connection with an illustrative embodiment, and with reference to the accompanying drawings thereof, in which:

FIG. 3 is a view in side elevation, with a portion broken away, of the support shown in FIG. 2, the work supporting position of the slide being shown in dash lines;

FIG. 4 is a plan view of the base and slide in initial or unloaded condition;

FIG. 5 is a section taken on the line V—V in FIG. 3;

FIG. 6 is a section taken on the line VI—VI in FIG. 3;

FIG. 7 is a section taken on the line VII—VII in FIG. 3; and

FIG. 8 is a section taken on the line VIII—VIII in FIG. 4.

DESCRIPTION OF PREFERRED EMBODIMENT

Figure 1:
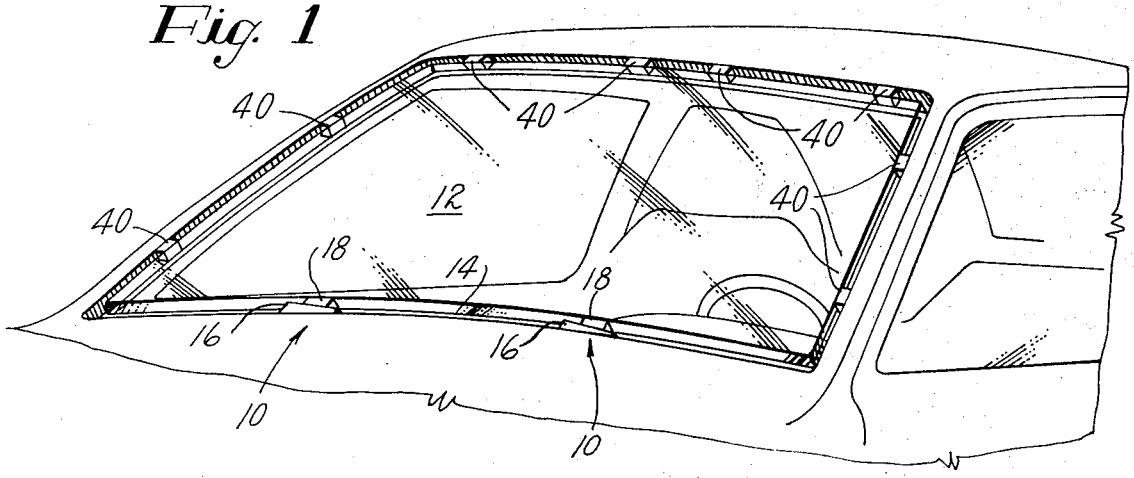
FIG. 1 is a perspective view of a windshield mounted with the aid of a pair of adjustable work supports in accordance with this invention.
Figure 2:
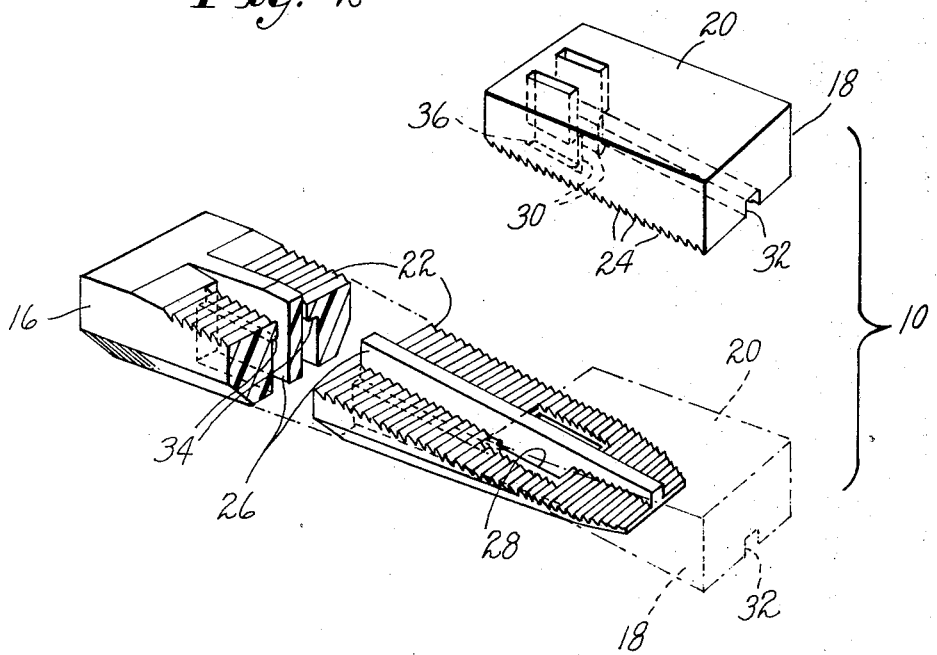
FIG. 2 is an exploded perspective view of one of the two-part molded supports shown in FIG. 1, the base and slide parts being in initial unloaded relation.

The invention will be described with reference to a novel two-piece adjustable work support and spacing device generally designated 10 (FIGS. 1–4). As herein illustrated, for purposes of mounting a workpiece in the form of a window glass such as a windshield 12 (FIG. 1) in a supporting structure exemplified by a preformed vehicle frame 14, the composite device 10 is wedge-like and preferably molded of plastic. One part of the adjustable spacing support 10 is an elongated tapered base 16 which may be of generally uniform width. The bottom of this base 16 is usually flat and engageable with the frame 14. The base 16 is formed with a planar ramp surface convergent with one end of the bottom surface with an angle of inclination less than about 10° and often about 5°–6°.

The other part of the device 10 is a tapered, complemental slide 18 (FIGS. 2–8) having a work supporting, i.e., glass edge abutting, surface 20 substantially parallel to the base bottom when the two parts are operatively connected as will be described. Interfaces of the base 16 and of the slide 18 are formed with cooperative serrations which desirably are formed as transversely extending teeth 22, 24, respectively, for a purpose subsequently noted.

The base 16 is provided with a central, longitudinally extending tongue or guide portion 26 projecting substantially uniformly above the ramp surface teeth 22. The guide 26 is defined by parallel, coextensive slots in the base 16, the slots opening wider adjacent to the convergent end of the base as at 28,28 in order that a key portion of the slide in the form of a pair of spaced, resilient arms 30,30 may be detachably received over an end portion of the guide. As will be seen in FIGS. 2–4, the preferred arrangement is such that at its "lower" position in a range of possible work supporting-spacing relations with the base 16, a trailing portion of the slide 18 may overhang the base convergent end, the sliding key arms 30,30 projecting from a leading end portion of the slide interface and on opposite sides of a longitudinal groove 32 slidably receiving the guide 26. The parallel base slots are defined in their narrower portions by undercuts 34,34 providing cooperative interlocking guide means for the out-turned flanged ends 36 of the arms 30,30. It will accordingly be understood that upon assembly the base and slide may be relatively moved longitudinally from the "lower" position shown in FIG. 3 to an adjustable "upper" or interlocked load-supporting position shown in dash lines wherein the surface 20 engages an edge of the window 12 and suitably spaces it with respect to the frame 14. The slide 18 desirably is shorter than the base 16 and the assembly will usually be left permanently in its adjusted working position.

It will be apparent that, alternatively, the interlocking guide means may include a guide rail in the slide part and cooperating groove in the base part.

The interfaces of the base 16 and of the slide 18 are formed with the interengageable transversely extending teeth 22,24 respectively, and these are angularly biased for intermeshing to maintain the slide against retrograde movement from its adjusted load supporting position. In one form the illustrative assembly 10 has a base on the order of not over 2½ inches overall length and provides a take-up variation on the order of about 0.25 to about .45 inches. Although the particular application herein illustrated contemplates that relative operating movement of the slide 18 will be generally in the plane of the workpiece 12 to be supported, it will be apparent that when desired such operating movement may be normal to the plane of the workpiece, or at some intermediate angle if circumstances require.

Usage of the invention will now be reviewed in connection with mounting the windshield 12. It conveniently may initially have been fitted in its frame 14 with sealing margins properly maintained as by spacers 40 (FIG. 1) or the like along the sides and top. The vehicle assembler, it may be assumed, then requires a take-up adjustment to take care of production variations between the bottom of the windshield opening and the bottom edge of the installed glass. A pair (or more) of the spacing devices 10, each initially loosely retained in assembly as shown in FIGS. 3 and 4, will be placed with their bases 16 spaced apart and extending beneath the lower edge of the windshield and having their bottom surfaces engaging the frame 14. Next, each of the slides 18 is relatively moved upwardly on the respective base ramp surfaces, the slide 18 and the base 16 now being slidably interconnected by the interlocking guide means 26,32 and the key arms 30,36. Each slide is thus urged upwardly in wedging manner until its surface 20 firmly engages and supports the adjacent bottom edge locality of the windshield 12. In thus advancing the slide relatively over the thicker portion of the base and away from its bottom surface, the interface teeth 22,24 do not resist relative movement, the resilient key flanges 36 permitting slight upward displacement of the teeth 24 relative to the teeth 22, when necessary as the flanges 36 frictionally engage the resilient ramp shoulders defined by the undercuts 34,34. When each slide 18 has been thrust, either manually and/or with a light tap of a mallet for some workpieces, into take-up or load supporting position, the teeth 22,24 are in full mesh over an area and their angular bias prevents retrograde movement of the slide. It will be appreciated that a variable gap between the work supporting frame 14 and the windshield bottom edge has then been adjustably taken up in a permanent manner and weather sealant and trim may be applied about the windshield edge.

Having thus described my invention, what I claim as new and desire to secure by Letters Patent of the United States is:

1. An adjustable two-part molded spacer assembly for mounting a window glass of a vehicle with respect to a frame portion thereof, the spacer assembly including a wedge-like base having a flat bottom engageable with the frame portion at a locality spaced from an edge portion of the glass to be supported and a ramp surface convergent with the bottom at an angle of inclination less than 10°, said base being provided with a central, longitudinally extending guide projecting substantially uniformly above said ramp surface, and a tapered slide longitudinally slotted to receive the guide and having a surface adapted to engage said glass edge portion, said slide having a key portion projecting therefrom, the guide being defined by substantially co-extensive parallel slots in the base, said slots being wider adjacent the convergent end of the base to provide snap-fit reception over an end of the guide of said key portion formed on the slide, the narrow portions of the slot cooperating with said key portion to slidably lock the base and slide in operative relation, and the interfaces of the base and slide being formed with cooperative serrations whereby, when the slide is relatively moved on said ramp surface away from the convergent end of the base and into supporting and abutting relation to said glass edge portion, the position of the glass will be maintained with respect to the frame portion.

2. A spacer assembly as in claim 1 wherein the slide key portion includes a pair of resilient, spaced arms respectively having flanged ends slidably receivable in resilient undercut portions of the base defining said parallel slots while embracing said projecting guide, said serrations are in the form of transverse, angularly biased teeth for locking the slide and base in working position, and the interface teeth of the base and slide are slightly spaced apart during advance of the slide toward work-supporting position whereupon window glass engagement by the slide forces its teeth to mesh with those of the base to hold the slide against retrograde movement.

3. A two-part wedge-type spacer and work support comprising a tapered base and a complemental slide thereon, the base and slide integrally including guide means for slidably interconnecting the base and slide as they are relatively moved between an inoperative position and an adjusted load-supporting position, the slide being shorter than the base and having a work engaging surface disposed parallel to the bottom surface of the base, interfaces of the base and slide being formed with cooperative serrations adapted to maintain the base and slide in said load-supporting position, said guide means including a central longitudinal tongue in one part and a complemental groove in the other part for receiving the tongue, one of the base and the slide being integrally formed with a pair of upstanding resilient arms for slidably embracing the tongue, the arms respectively having flanged ends, and the other of the base and the slide being undercut at portions extending parallel to the tongue to receive said flanged ends, respectively, the widthwise extent of the undercut portions being less in localities more remote from the base portion than adjacent to said base bottom to enable snap-fit assembly of the base and slide in inoperative relation and interlocking of the base and the slide as they are relatively moved into load-supporting position.

4. A work spacer and support as in claim 3 wherein said resilient arms project from opposite sides of an end of said groove, and the groove is formed in the slide, whereby the slide has limited play heightwise of said serrations in the base until the slide engages the work to be supported.

* * * * *